Figure 1:
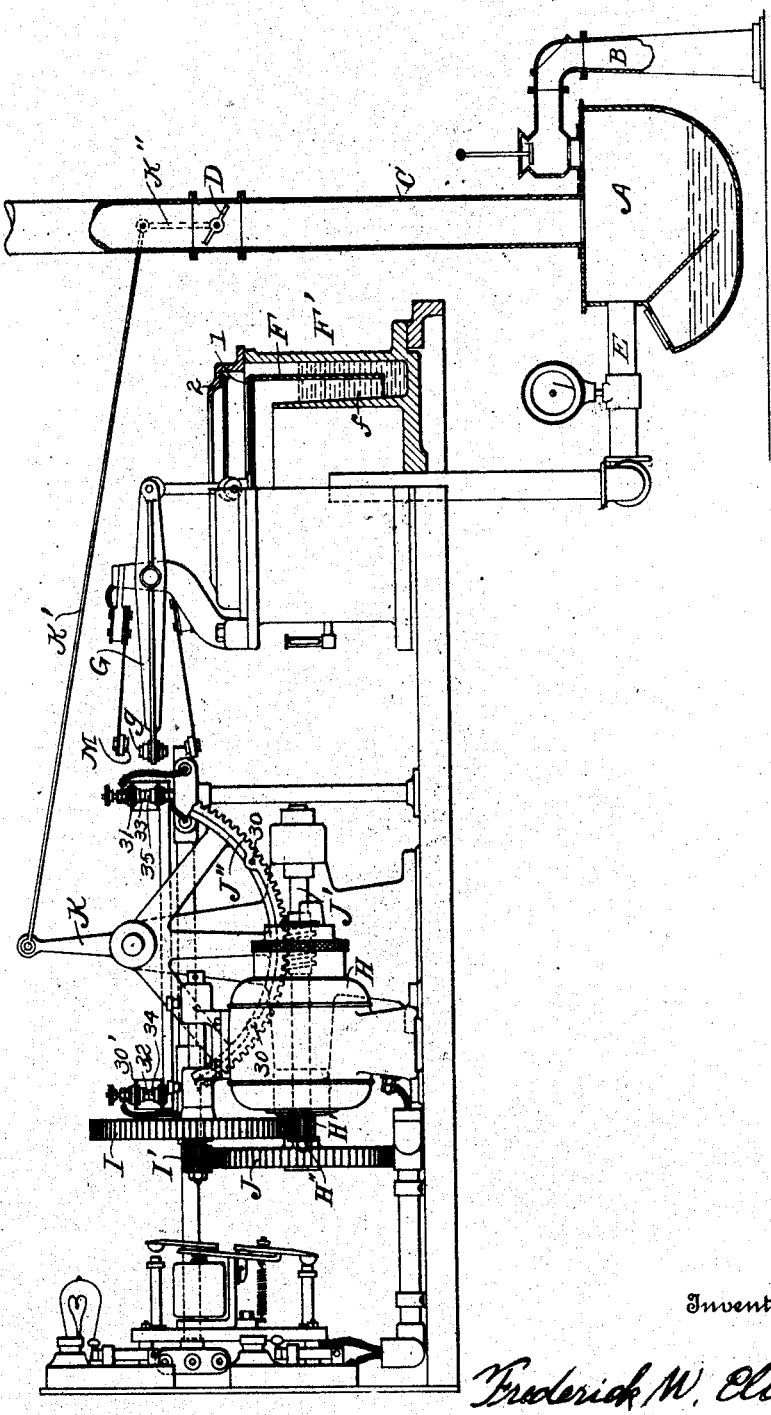

F. W. ELLS.
AUTOMATIC PRESSURE CONTROLLED VALVE MECHANISM.
APPLICATION FILED SEPT. 9, 1914.

1,172,774.

Patented Feb. 22, 1916.
2 SHEETS—SHEET 1.

Witnesses
Inventor
Frederick W. Ells
By Erwin E. Wheeler
Attorney.

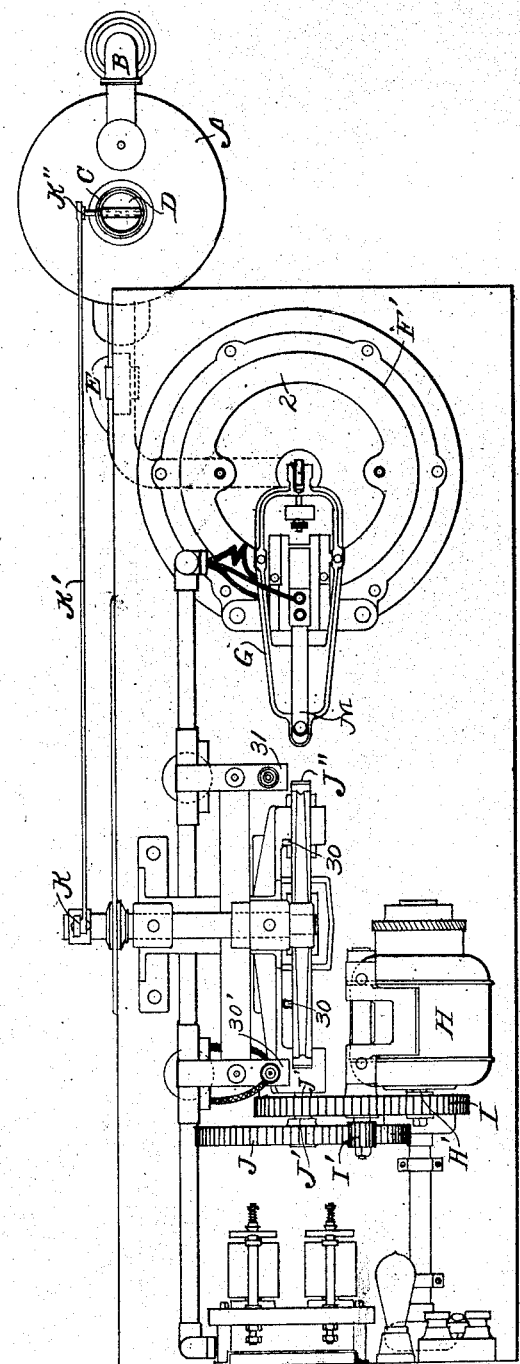

UNITED STATES PATENT OFFICE.

FREDERICK W. ELLS, OF MILWAUKEE, WISCONSIN.

AUTOMATIC PRESSURE-CONTROLLED VALVE MECHANISM.

1,172,774. Specification of Letters Patent. Patented Feb. 22, 1916.

Application filed September 9, 1914. Serial No. 860,930.

*To all whom it may concern:*

Be it known that I, FREDERICK W. ELLS, a citizen of the United States, residing at Milwaukee, county of Milwaukee, and State of Wisconsin, have invented new and useful Improvements in Automatic Pressure-Controlled Valve Mechanisms, of which the following is a specification.

My invention relates to improvements in automatic pressure controlled valve mechanisms of that class in which auxiliary power, such as that derived from an electric motor, is utilized for the direct operation of the valve or valves, whereby the apparatus is rendered sensitive to the extremely slight variations in pressure required for closing an electrical circuit.

An apparatus of the general type above mentioned, is shown in Letters Patent of the United States to Otto F. Greim, dated November 1, 1910, and numbered 974,260 for automatic pressure regulators for gas collecting mains.

In practical experience with such apparatus in controlling gas pressures, it has been found that in case of a failure of the apparatus to operate properly, such as might arise from an accidental interruption of the electrical power current, there is danger of an excess pressure developing in the gas main, which might cause a rupture in some portion of the system with consequent discharge of gas to the exterior. This danger is accentuated where gas bells are employed to actuate the switches, since these bells, as heretofore constructed, are sealed in liquid, out of which they may be lifted under excessive gas pressures. It has also been found that in cases where it has been attempted to directly operate the circuit closing switches of an electric motor from a slowly moving gas bell, destructive arcing may result as the switch members move into approximate but not absolute contact. These and other disadvantages hereinafter referred to have been overcome in my improved apparatus, the object of my invention being to provide a more sensitive, safe, and reliable apparatus.

In some respects my invention may be regarded as a direct improvement upon the apparatus disclosed in said patent to Greim, by providing a gas bell which will also serve as a valve under excess pressures; by providing a motor having switches which are indirectly operated by the bell through an auxiliary circuit; and by substituting a dynamic brake for the magnetic brake disclosed in said patent, thereby providing better control of the motor armature.

In the drawings—Figure 1 is a side elevation of a pressure controlled mechanism embodying my invention, with parts broken away in longitudinal section. Fig. 2 is a plan view of the same.

Like parts are identified by the same reference characters throughout the several views.

In its general operation, my improved apparatus is similar to that illustrated in the patent to Greim above referred to. A gas main or reservoir A has a feed duct B and outlet duct C provided with a valve D, the adjustment of which regulates the pressure in the main A. A branch duct E leads to the interior of a bell F, the lower margin of which is sealed in a body of liquid contained in a reservoir F'. With increasing or diminishing pressure, the bell F rises or falls and its motion is transmitted to a switch lever G, (to one arm of which it is linked). When this lever has been moved a predetermined distance from neutral position in either direction, it closes an electrical circuit and starts an electric motor H to readjust valve D, the motion of the motor being transmitted to the valve through motor shaft H', pinion H'', gear wheel I, pinion I', gear wheel J, worm shaft J', worm segment J'', arm K thereof, link rod K' and valve lever K''. When the pressure in the gas main (and bell F) has been sufficiently varied to restore switch lever G to circuit breaking position, the current to the motor is cut off and the valve shifting movement ceases until further adjustment is required.

All of the above described parts may be assumed to be old in the art except as hereinafter more particularly described and set forth in the claims hereof.

*The pontoon switch.*—It will be observed (Fig. 1) that the gas bell F is provided with a ring valve I, which seats against an inturned flange 2 on the tank F', which partially caps the bell. When bell F is lifted by the gas pressure therein, ring valve I approaches seat 2 and will seat thereon before the lower margin of the bell is lifted out of the sealing liquid *f* in tank F'. If this valve I should be thus closed, a further rise in pressure will not only increase the pressure of the valve upon its seat, but will tend to force the sealing liquid out of the bell into the annular space surrounding it.

But as this annular space is limited in capacity, the air pressure above the liquid will also increase and prevent the liquid from rising high enough to permit an escape of gas into such space from the bell. Even if gas should so escape, a small quantity thereof would equalize the pressures in the bell and in such space, and thus restore the seal. It is therefore obvious that in case of a failure in the operation of the electrical apparatus, the pressure in the main A could not rupture the seal and discharge gas to the exterior to any material extent.

When pontoon switch lever G is actuated by the bell F to bring its contact $g$ to contact terminals M, the electric motor H will be started in one direction to adjust the valve D to a closed position, thereby allowing the pressure to build up in the gas main or reservoir A. A reverse movement of the bell F will eventually bring the contacts G to contact terminal M', thereby closing a reverse circuit through the motor to adjust the valve D to a more open position and relieving pressure in the main or reservoir A. The arrangement of the motor circuits and the means for controlling the same through the medium of the switches, is made the subject of a companion application and therefore is not claimed herein nor described in detail.

The specific type of valve (illustrated as the valve D) is not material to my invention. Any type of valve and valve actuating connections may be employed.

I also do not limit the scope of my invention to any specific form of motor actuated members for connecting up the circuits as herein described.

I claim—

1. A pressure regulating pontoon switch, including the combination with a motor controlling switch lever, of a liquid container, and a gas receiving bell in said container connected with said switch lever and sealed in the container liquid, a portion of said bell being formed to seat against a portion of the container, to limit upward movements of the bell and close the liquid receiving portion of the container.

2. A pressure regulating pontoon switch, including the combination with a motor controlling switch lever, of a liquid container, and a gas receiving bell connected with the lever and having an open lower end adapted to seal in the liquid of the container, said bell having a valve adapted to seat against a portion of the container to form a gas tight receptacle, when the bell has raised a predetermined distance in the sealing liquid, substantially as described.

3. A pontoon switch, including a liquid container provided with an inturned flange, in combination with a gas receiving bell, having a valve member adapted to seat on said flange and close the container, substantially as described.

In testimony whereof I affix my signature in the presence of two witnesses.

FREDERICK W. ELLS.

Witnesses:
LEVERETT C. WHEELER,
JOSEPHINE MAZZONI.